Patented May 1, 1945

2,375,138

UNITED STATES PATENT OFFICE 2,375,138

ALKAMINE ESTERS OF ARYLOXYMETHYL BENZOIC ACID

Victor S. Salvin, Cumberland, Md., and Arthur J. Hill, New Haven, Conn., assignors to American Cyanamid Company, New York, N. Y., a corporation of Maine No Drawing. Application May 1, 1942, Serial No. 441,374

5 Claims. (Cl. 260—473)

This invention relates to alkamine esters of p-aryloxymethylbenzoic acid.

According to the present invention a series of alkamine esters of p-aryloxymethylbenzoic acid can be prepared, some of which show local anesthetic power and others are useful as intermediates in the production of pharmaceuticals and other chemicals.

In general two principal processes may be used in preparing the esters. One method which is applicable to some of the products starts out with a p-cyanbenzyl halide such as the bromide which is then etherified with the corresponding sodium phenylate, the cyano group hydrolyzed to the acid, transformed into the acid chloride with agents such as thionyl chloride followed by esterification with the amino alcohol desired. This method is not suitable with certain aryloxy compounds such as for example nitro compounds as many of them cannot withstand the hydrolysis and these compounds may be prepared by reacting the phenylate with an alkyl ester of p-halogen methylbenzoic acid followed by alcoholysis with the desired amino alcohol, preferably in the presence of a metal alcoholate as an alcoholysis catalyst. This second method is the only one which can be used with some of the compounds and is generally applicable to all of the compounds falling under the present invention. The products of the present invention are new chemical compounds and are not intended to be limited to any particular method of production but in more specific aspects the two preferred processes are included.

The esters of the present invention are secondary or tertiary amines and form the usual salts such as hydrochlorides, sulfates, borates and the like. The salts of the bases are therefore included in the invention and in fact the crude product obtained by extraction with dilute hydrochloric acid is the hydrochloride rather than the free base. Quaternary nitrogen salts may also be prepared such as for example the methiodides, ethobromides, and the like.

The invention will be described in greater detail in conjunction with the following specific examples which are typical illustrations. The parts are by weight.

EXAMPLE 1

*Ethyl-p-nitrophenoxymethyl benzoate*

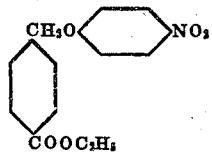

23 parts of sodium are dissolved in 1200 parts of absolute alcohol. 140 parts of p-nitrophenol are then added and the mixture stirred and refluxed until the formation of the sodium nitrophenolate is complete. 198 parts of ethyl-p-chlormethyl benzoate are then dissolved in 400 parts of absolute alcohol and gradually added to the solution of the sodium nitrophenolate with vigorous stirring. After all of the ester has been added the reaction mixture is stirred and refluxed until reaction appears complete.

The excess alcohol is removed from the reaction mixture by distillation and 1000 parts of water added to the residual material. The reaction product is slurried up in the water, filtered and further washed with water and can, if desired, be purified by crystallization from alcohol in which case it appears in the form of faintly yellow crystals melting at 122° C.

EXAMPLE 2

*β-Diethylaminoethyl-p-nitrophenoxymethyl benzoate*

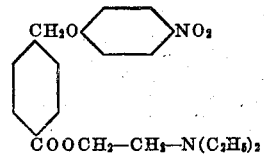

To 300 parts of β-diethylaminoethanol there is added 1 part of sodium and then 140 parts of ethyl-p-nitrophenoxymethyl benzoate prepared as described in Example 1 is introduced. A precipitate forms and continues as the mixture is heated at 125° C. for a considerable period until the alcoholysis appears to be complete.

The reaction mixture is extracted with ether and the insoluble solid separated by filtration. After drying the ether extract the excess ether is removed and then distillation under reduced pressure is started, the β-diethylaminoethanol coming off first and leaving a heavy oil which contains the alkamine ester. This heavy oil, which is not pure, is dissolved in dry ether and a solution of hydrogen chloride and dry ether is very gradually added until precipitation ceases. The precipitate, which is the hydrochloride of the alkamine ester, is slightly yellow in color and after redistillation from absolute alcohol it is obtained in the form of yellow needles melting at 194–195° C. The free base may be obtained in pure form and by neutralization of the hydrochloride.

EXAMPLE 3

*p-Cresoxymethyl benzonitrile*

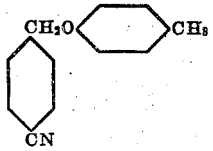

58 parts of sodium are dissolved in 1200 parts of absolute alcohol and 280 parts of p-cresol dissolved in 400 parts of absolute alcohol are added. The mixture is then refluxed until formation of the sodium cresolate is complete. 480 parts of p-cyanbenzylbromide dissolved in 2000 parts of absolute alcohol are gradually added to the sodium cresolate, the mixture being gently refluxed and stirred during the addition, and stirring and refluxing maintained thereafter until it becomes neutral to litmus.

The alcohol is removed under diminished pressure and the residue slurried with 1000 parts of water. The sodium bromide formed in the reaction dissolves and the undissolved crude solid p-cresoxymethylbenzonitrile is filtered off, washed with a small amount of sodium hydroxide and then purified by crystallization from alcohol from which it separates in the form of white plates melting at 102° C. The nitrile is soluble in benzene and acetone.

EXAMPLE 4

*p-Nitrophenoxymethyl benzonitrile*

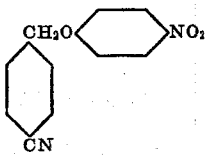

29 parts of sodium are dissolved in 800 parts of absolute alcohol and 170 parts of p-nitrophenol added and the mixture refluxed until formation of the nitrophenolate is complete. 250 parts of p-cyanbenzylbromide dissolved in 2000 parts of benzyl alcohol are then added gradually, the colored sodium nitrophenolate disappearing and being replaced with precipitated sodium bromide. The reaction mixture is refluxed and stirred throughout the addition and thereafter until it becomes neutral to turmeric paper.

Alcohol is removed by distillation and the residue slurried with 1000 parts of water, the nitrile remaining as a gray solid which is filtered off and washed with water. The crude nitrile is then purified by recrystallization from alcohol in the form of needles melting at 157° C. It is sparingly soluble in ether.

EXAMPLE 5

*p-Phenoxymethyl benzoic acid*

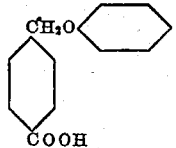

28 parts of p-phenoxymethyl benzonitrile are added to 240 parts of 20% alcohol containing 40 parts of sodium hydroxide in solution. The mixture is refluxed until evolution of ammonia ceases. The sodium salt of the acid is suspended in the mixture which is extracted with ether to remove any unhydrolyzed nitrile or amide formed. On acidification with dilute hydrochloric acid the free acid is obtained as a solid which is filtered off and washed with water and purified by crystallization by alcohol separating in the form of needles melting at 207° C., the yield being in excess of 75% of the theoretical.

EXAMPLE 6

*p-Cresoxymethyl benzoic acid*

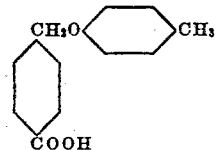

35 parts of p-cresoxymethyl benzonitrile prepared as described in Example 3 are added to 240 parts of 20% alcohol containing 40 parts of sodium hydroxide. The mixture is refluxed until evolution of ammonia ceases at which time the sparingly soluble sodium salt of the acid is present in the reaction mixture in the form of a suspension. The alkaline suspension is then extracted with ether to remove any unhydrolyzed nitrile or amide formed and upon acidification with dilute hydrochloric acid the free acid is liberated as a solid which is filtered off and washed with water. The crude product thus obtained is purified by crystallization from alcohol from which it separates in large needles melting at 198° C. The yield is in excess of 75%.

EXAMPLE 7

*p-Phenoxymethyl benzoylchloride*

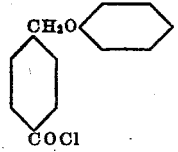

To 125 parts of p-phenoxymethylbenzoic acid prepared as described in Example 5 are gradually added 480 parts of thionyl chloride, the mixture being gently refluxed until the acid has entirely dissolved. The excess thionyl chloride is removed under reduced pressure and the residual solid is purified by recrystallization from petroleum ether from which it separates as long white needles melting at 60–62° C. A quantitative yield is obtained.

EXAMPLE 8

*p-Cresoxymethyl benzoylchloride*

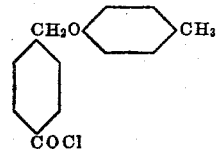

To 14 parts of p-cresoxymethyl benzoic acid prepared as described in Example 6 there is added 50 parts of thionyl chloride and the mixture gently refluxed until the acid has completely dissolved. Unreacted thionyl chloride is removed by distillation under reduced pressure and the solid residue purified by crystallization from petroleum ether from which it is obtained in the form of white needles melting at 73–74° C. The yield is quantitative.

EXAMPLE 9

*γ-Diethylaminopropyl-p-phenoxymethyl benzoate*

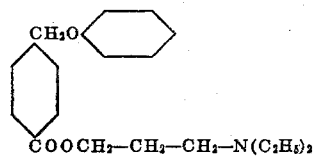

70 parts of p-phenoxymethyl benzoylchloride prepared as described in Example 7 are dissolved in 600 parts of dry ether and 78 parts of γ-diethylaminopropanol dissolved in 400 parts of dry ether are gradually added with vigorous stirring. A solid precipitates and after the addition is complete the reaction mixture is gently refluxed for several hours.

The ether suspension of the hydrochloride of the alkamine ester is extracted with cold dilute hydrochloric acid and the extract then made alkaline with solid sodium carbonate to liberate both the ester and any excess amino alcohol. The solution is then extracted with ether and the ether extract removed. The residual liquid is then distilled under reduced pressure. Excess amino alcohol comes over first and the ester itself finally distills over in the form of a straw colored oil boiling at 245–248° C. (6 mm.) The yield is approximately 60% of the theoretical.

The free base can be transformed into its hydrochloride by dissolving the base in ether and cautiously adding an ether solution of dry hydrogen chloride until the hydrochloride precipitates as a heavy white solid. The solid can be filtered off, washed with ether and dried and then purified by recrystallization with benzene from which it separates as small white needles melting at 144–145° C. A yield of approximately 85% is obtained and the salt is soluble in water and is non-hygroscopic.

Example 10

*γ-Diethylaminopropyl-p-cresoxymethyl benzoate*

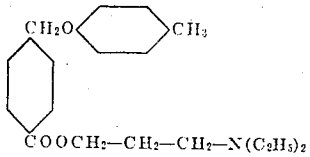

100 parts of p-cresoxymethyl benzoylchloride prepared as described in Example 8 are dissolved in 600 parts of dry ether and 98 parts of γ-diethylaminopropanol dissolved in 100 parts of dry ether are then gradually added to the acid chloride with vigorous agitation. Precipitation of a solid takes place and after all of the addition is effected the reaction mixture is refluxed and stirred for several hours. The ether suspension of the hydrochloride obtained is extracted with cold dilute hydrochloric acid and the extract made alkaline with solid sodium carbonate to liberate excess amino alcohol and the ester itself. The solution is then extracted with ether, the ether extract dried and the ether removed leaving an oil which contains the free base. This oil is distilled under reduced pressure, the excess amino alcohol coming over first and the temperature then rising almost immediately to 248 to 250 C. (5 mm.) at which time the ester comes over as a straw colored oil which solidifies on standing. The yield is approximately 70% of the theoretical.

The ester can be transformed into its hydrochloride by dissolving in dry ether and bubbling a stream of dry hydrogen chloride into the solution until precipitation is complete. The crude hydrochloride can be purified by crystallization from benzene, separating in the form of plates melting at 139° C. It is non-hygroscopic and soluble in water, the yield being about 77%.

Example 11

*β-Diethylaminoethyl-p-phenoxymethyl benzoate*

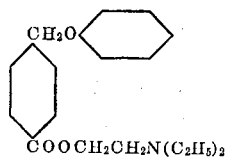

The procedure of Example 9 is followed except that a stoichiometrically equivalent amount of β-diethylaminopropanol is substituted for the γ-diethylaminopropanol. The ester is obtained in the form of a high boiling straw colored oil closely resembling the γ-diethylaminopropyl compound and it can be transformed into its hydrochloride in the same manner as described in Example 9.

Example 12

*β-Dibutylaminopropyl-p-cresoxymethyl benzoate*

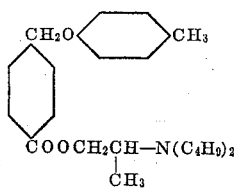

The procedure of Example 10 is followed substituting an equivalent amount of β-dibutylaminopropanol for the γ-diethylaminopropanol of the example. The ester obtained is in the form of a straw colored oil closely resembling the γ-diethylaminopropyl ester. The hydrochloride can be prepared in the same manner as described in Example 10.

The examples describe alkamine ether esters of some of the more common amino alcohols. The reaction by which the ether esters are made, however, is quite general and applicable to any amino alcohol which is capable of forming alcoholates. It should be also noted that the substituents on the nitrogen do not have to be separate alkyl chains but may form part of a ring such as piperidine or morpholine ring. Examples of other alcohols which can be used to produce the corresponding ether esters are the dibutylaminobutanols, β,β-phenylethylaminoethanol, β-dipropylaminoethanol, β-morpholinoethanol, β-piperidinoethanol, β-dicyclohexylaminoethanol, β-methylcyclohexylaminoethanol, β-phenylaminoethanol, β,β-dimethyl-γ-piperidinopropanol and the like.

We claim:

1. A dialkylaminoalkanol ester of a p-aryloxymethylbenzoic acid.
2. A dialkylaminoalkanol ester of p-phenoxymethylbenzoic acid.
3. A dialkylaminoalkanol ester of a p-cresoxymethylbenzoic acid.
4. A method of producing an alkamine ester of a p-aryloxybenzoic acid which comprises subjecting an alkyl ester of a p-aryloxymethylbenzoic acid to alcoholysis with a saturated tertiary amino alcohol.
5. A method according to claim 4 in which the alcoholysis is effected in the presence of a metal alcoholate as a catalyst.

VICTOR S. SALVIN.
ARTHUR J. HILL.